United States Patent [19]

Zago

[11] Patent Number: 4,816,951
[45] Date of Patent: Mar. 28, 1989

[54] DEVICE FOR CLEANING TAPE CONTACTING MEMBERS IN VIDEO TAPE RECORDERS AND THE LIKE APPARATUS

[76] Inventor: Giovanni Zago, Via N. Aprilis 41, S. Quirino (Prov. Pordenone), Italy

[21] Appl. No.: 923,795
[22] PCT Filed: Nov. 19, 1985
[86] PCT No.: PCT/EP85/00630
  § 371 Date: Sep. 22, 1986
  § 102(e) Date: Sep. 22, 1986
[87] PCT Pub. No.: WO86/03326
  PCT Pub. Date: Jun. 5, 1986

[30] Foreign Application Priority Data
Nov. 22, 1984 [IT] Italy ............................ 83439 A/84

[51] Int. Cl.⁴ .............................................. G11B 5/10
[52] U.S. Cl. ................................ 360/128; 15/210 R
[58] Field of Search ............... 360/128, 137, 133; 15/210 R

[56] References Cited

U.S. PATENT DOCUMENTS

| | | | |
|---|---|---|---|
| 3,997,919 | 12/1976 | Thompson | 360/137 |
| 4,211,580 | 7/1980 | Vowles | 360/137 |
| 4,631,615 | 12/1986 | Grossman et al. | 360/128 |
| 4,631,616 | 12/1986 | Zago et al. | 360/128 |
| 4,669,017 | 5/1987 | Blank et al. | 360/128 |
| 4,685,015 | 8/1987 | Zago et al. | 360/128 |

FOREIGN PATENT DOCUMENTS

| | | |
|---|---|---|
| 2158994 | 12/1972 | Fed. Rep. of Germany . |
| 3212730 | 9/1983 | Fed. Rep. of Germany ...... 360/128 |
| 58-114324 | 7/1983 | Japan .................................. 360/128 |

Primary Examiner—John H. Wolff
Assistant Examiner—Matthew J. Bussan
Attorney, Agent, or Firm—Mason, Fenwick & Lawrence

[57] ABSTRACT

The device comprises a case, insertable into the cassette receiving compartment of an apparatus to be cleaned and having a pair of spools rotatably mounted therein. The spools are adapted to be driven by the cassette drive mechanism of the apparatus to be cleaned and have a web wound thereon. The device further comprises an aerosol type container containing cleaning fluid, being located in said case and adapted for being automatically actuated by actuating elements upon introduction into a cassette receiving compartment. Fluid distribution members being provided to distribute fluid displaced from the container onto the web.

5 Claims, 1 Drawing Sheet

DEVICE FOR CLEANING TAPE CONTACTING MEMBERS IN VIDEO TAPE RECORDERS AND THE LIKE APPARATUS

BACKGROUND OF THE INVENTION

The present invention relates to a device for cleaning tape contacting members in video tape recorders and the like apparatus.

As is known, the various tape contacting parts of video tape recorders or similar apparatus such as heads, capstans, guides and entrainment or pinch rollers require cleaning periodically.

Failure to clean or insufficient cleaning of such parts in a known manner adversely affects the quality of recording and/or reproduction and in cases of excessive neglect can even cause damage of the apparatus. However, such tape contacting members are frequently difficult to clean by virtue of their inaccessibility.

Prior European patent application No. 85110080.0 by this same applicant discloses a cleaner cartridge, for cleaning audio and video tape recorders and players, comprising a cartridge body and a detergent reservoir, externally attached to said cartridge body and being selectively disassemblable, assemblable, replaceable, and refillable.

However, in the particular instance of a video tape recorder the parts to be cleaned are different from those of the audio player-recorders, in that the parts to be cleaned are only accessible by a tape. For this reason cleaner cartridges have been proposed which comprise a tape which contacts the video tape recorder's heads and guide and entrainment devices.

Also currently known are cleaning fluids, usually sold in bottles and intended for application to the heads, capstans, etc. by means of a small applicator pad or brush.

Various types of cleaning cassettes and cartridges are also known, which contain a web and/or brushes impregnated, with cleaning substances and others which comprise a reservoir or externally located bottle containing detergent liquid for moistening those parts of the cartridge adapted to contact the various members of the apparatus to be cleaned.

However, such prior means and devices for cleaning the tape contacting members in video tape recorders are not devoid of drawbacks.

The cleaning fluids sold in bottles and intended for manual application by such means as brushes or pads, whilst being suitable for cleaning easily accessible members in audio apparatus, cannot be effectively applied to awkwardly located or inaccessible parts in a video recorder. Thus, whilst being useful for the skilled technician who my wish to clean disassembled components, the periodic application of such fluids to the heads etc. of a video recorder is an impossible task for the layman.

Cartridges containing impregnated webs or brushes must either be very frequently re-moistened by manual intervention or disposed when their cleaning ability diminishes, and in a known manner, an insufficiently moist web may merely transfer dust and foreign matter from one member to another, without efficiently cleaning the apparatus.

Even the known cartridges with fluid reservoirs are not devoid of drawbacks which mainly reside in the fact that it is impossible to wipe all of the moving or fixed parts of the cartridge which will come into contact with the apparatus to be cleaned, and in the case where an externally located bottle is utilized, the cartridge becomes unwieldy and expensive.

SUMMARY OF THE INVENTION

Accordingly, it is an aim of the present invention to provide a device for cleaning tape-contacting members in video tape recorders and the like which overcomes the problems of the known devices, and in particular permits the effective cleaning of all of the tape contacting members such as heads, capstans, rollers etc., even where inaccessibly located.

Within the above aim it is an object of the invention to provide a device which carries out the cleaning operation in an automatic manner without the requirement of any manual intervention.

It is another object of the invention to provide a device which does not compulsorily avail itself of externally mounted bottles, and which, on the contrary, is very compact.

A further object of the invention is to provide a device which is very reliable, safe and simple to use.

A not least object of the invention is to provide a device which can be manufactured from readily available elements and materials, and which is advantageous from a purely economical standpoint.

This aim and these and other objects which will become apparent hereinafter are achieved by a device for cleaning tape contacting members in video tape recorders and the like apparatus, characterized in that it comprises a case, insertable into a cassette receiving compartment of an apparatus to be cleaned, at least a first spool and a second spool rotatably mounted on said case and adapted for driving engagement relationship with drive spindles of said apparatus to be cleaned, and a web, having at least one end attached to said first spool, at least one other end attached to said second spool, and an intermediate portion windable around said spools, said device further comprising a container located in said case and being adapted for containing cleaning fluid, actuating means adapted for causing fluid to be displaced from said container and distribution means, adapted for distributing fluid displaced from said container at least onto said web.

BRIEF DESCRIPTION OF THE DRAWINGS

Further features and advantages of the invention, will be apparent from the following detailed description of some preferred though not exclusive embodiments thereof, with reference to the accompanying illustrative, non-limiting drawings wherein.

DESCRIPTION OF THE PREFERRED EMBODIMENTS

Figure 1:
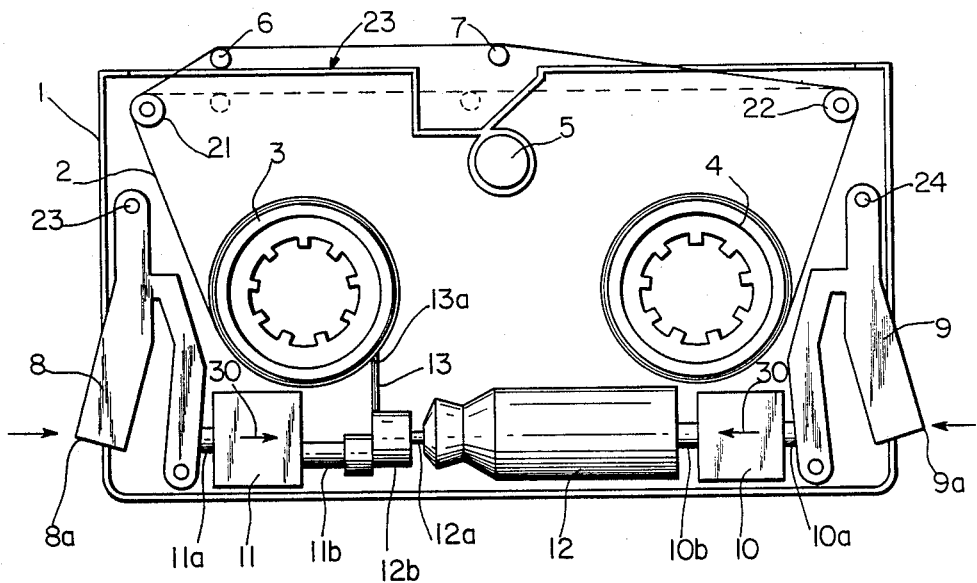
FIG. 1 is a schematic plan view of a device for cleaning tape contacting mebers in video tape recorders and the like according to the invention.

With reference to the above cited drawing figures, generally designated with the reference numeral 1 is a cassette type housing or case, expediently having the form of a standard cartridge or cassette as normally utilized with the apparatus to be cleaned. In the case 1 is a web or cleaning tape 2, rigidly associated at its ends with a first payout spool 3 and a second take-up spool 4 and being wound around one of the spools, or partially wound around each of the spools, for the major part of its longitudinal extension, a portion of the cleaning tape 2 extending between the two spools 3,4 and being trained around first and second guide pins or rollers, 21,22 respectively. The guide rollers are substantially equidistantly located from the front end or edge 23 of the container such that the web 2 may be unwound from the first spool 3 pass around the first guide roller 21, extend substantially parallel to the front end or edge 23 of the case 1 before passing around the second guide roller 22, and finally be wound around the second spool 4, or vice versa.

In a known manner, upon introduction of the case 1 into the cassette compartment of a video tape recorder, its presence is sensed by a photoelectric cell 5, which permits actuation of the recorder's drive motor and the web 2 to be engaged by the recorder's entrainment bars 6,7 which then move the web 2, from its path extending parallel to the front edge 23 of the case 1 to the various capstans, rollers and heads of the video-tape recorder's mechanism as illustrated in FIG. 1, just as would occur upon a video tape cassette being introduced into the cassette compartment. The spools 3,4, expediently being of the type utilized in video cassettes are adapted to be engaged by the drive spindles of the cassette recorder, and resultantly upon its actuation, the web 2 is unwound from the first spool 3 and wound around the second spool 4, or vice versa passing, as explained heretofore, around the various heads, capstans etc. of the video tape recorder.

Advantageously the invention provides, at the interior of the case 1, a small container cannister 12, expediently of the pressurized aerosol type, containing cleaning fluid and having an outlet tube 12a, which by being urged towards the body of the container against the elastic biasing action of the aerosol outlet valve 12d, causes the cleaning fluid contained therein to be released under pressure. Expediently provided on the outlet tube 12a is an adapter 12b, whereto is connected a diffusion tube 13, communicating with the outlet tube 12 and having an end 13a located proximately to the web or cleaning tape 2 near the path thereof, to deliver thereto cleaning fluid released from the container 12. Obviously, the tube 13 may terminate at one of the spools 3,4 or any portion of the interior of the case 1 containing web 2 which is being unwound before being passed around the heads, capstans etc. of the video tape recorder.

It will be understood that the cannister 12 is a reservoir means for holding a supply of cleaning fluid and the tube 12a, adapter 12b, and diffusion tube 13 are fluid applicator means for dispensing a cleaning fluid onto said tape.

Drawing FIG. 1 illustrates a first exemplary embodiment of means, for actuating the pressurized container 12 which comprise lever-like elements or ears 8,9, pivotally associated, at connection points 23,24 through pins screws or the like connection means, with the case 1, and having wall contacting portions 8a and 9a protruding laterally therefrom through appropriately formed side openings on the side walls thereof to define an overall width dimension which is greater than that defined by the interior of a cassette compartment of a video tape recorder, such that upon the case 1 being inserted into such a cassette compartment, the ears 8,9 are pushed inwards and are caused to rotate about the connection points 23,24. From the foregoing it will be understood that the ears 8, 9 protrude yieldably from the side walls of the housing 1.

This inward movement of the ears 8,9, is transmitted through link elements 10a,11a, to resultantly cause blocks or abutment elements 10,11 to move towards each other i.e. in the direction of the arrows 30 (FIG. 1). Associated with the abutment elements at the opposite sides thereof to the link elements are spacers, 10b,11b, adapted to act on the bottom of the container 12 and the adapter 12b respectively to thus cause the outlet tube to be pushed towards the container 12, thus causing pressurized fluid to be released therefrom and distributed, through the diffusion tube 13 onto the web 2.

Obviously, a fixed abutment may be provided at the adapter 12b or at the bottom of the container 12, to permit a single protruding ear to actuate the same.

Advantageously, the spacers and the link elements could be formed integrally with the abutment elements or the link elements may be associated with the ears 8,9. Any convenient kinematic transmission means could be utilized to transmit movement of the ears to the container 12, such as rods or levers.

Furthermore, any suitable means may be utilized to retain the container 12 and permit movement of the motion transmission members such as compartmentation of the case by the provision of internal walls, holders etc.

Figure 2:
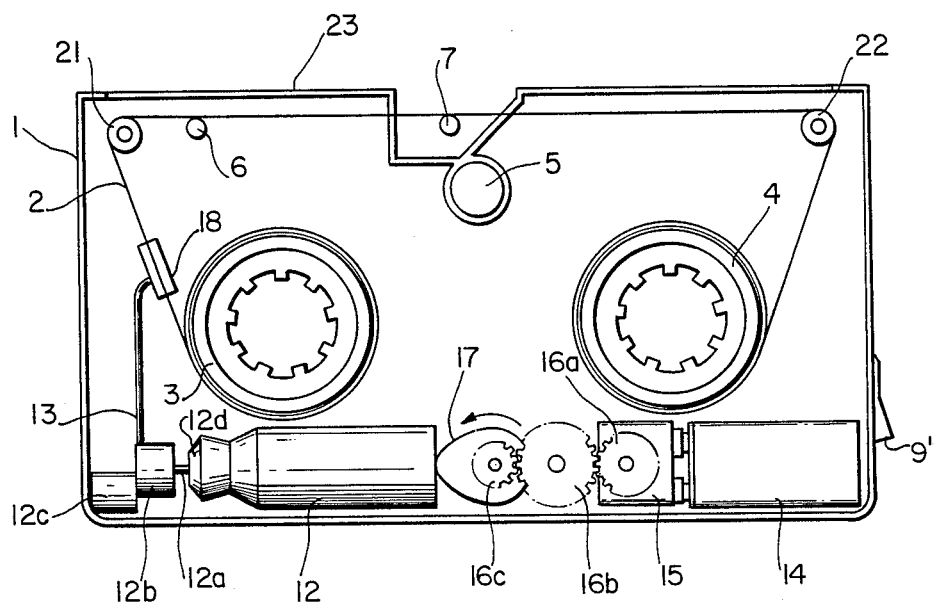
FIG. 2 is a schematic plan view of another embodiment of a device for cleaning tape contacting members in video tape recorders and the like according to the invention.

FIG. 2 illustrates another embodiment of the means for actuating the pressurized container 12 which comprise an electric motor 15, housed in the case 1 and receiving electrical power from a battery 14, also housed in the case 1. The motor 15 may be any small commercially available electric motor of the type utilized in motorized toys, of low voltage, such as those produced by the Swiss Company "MINIMOTOR". The electric motor 15 has an output shaft, wherewith a first toothed gear wheel 16a is rigidly associated and adapted for mesh engagement with a second toothed gear wheel 16b, advantageously rotatably mounted on a pin, rigidly associated with the case 1 and in turn adapted for mesh engagement with a third toothed gear wheel 16c, also advantageously rotatably mounted on a pin associated with the case 1 at a seat formed therein and having a cam 17 rigidly associated therewith, for example by means of teeth or protuberances protruding axially from the gear wheel 16c and engaging with the cam 17.

In this case the pressurized container 12 is located in the case 1 between the cam 17 and a container abutment 12c, wherewith the adapter 12b engages in abutment engagement relationship. The distance between the abutment 12c and the cam 17, at a position whereat its minor axis extends substantially in alignment with the longitudinal mid-axis of the container 12, corresponds to the longitudinal extension of the container 12, including the outlet tube 12a and adapter 12b associated therewith, in an inactive condition.

Thus, upon the cam 17, being rotated by the motor 15 and the cited gears 16 to a position whereat its major axis extends substantially in alignment with the longitudinal mid-axis of the container 12 (as illustrated in FIG. 2), the distance between the cam 17 and the abutment 12c is reduced, thus causing the container 12 to be pushed towards the adapter 12b abutting the abutment 12c and resultantly pushing the outlet tube 12a to cause pressurized fluid, to be released from the container and distributed onto the web 2 via the diffusion tube 13, and a distributor 18, advantageously provided at the end of the diffusion tube proximately located to or contacting said tape. From the foregoing it will be understood that the outlet tube 12a is responsive to the abutment action of abutment 12c.

Whilst the elastic biasing action of the aerosol outlet valve will be sufficient to return displaced elements such as the ears 8,9 to their original inoperative positions when the device is not being used, it will be appreciated that additional or alternative biasing means may be provided.

The battery 14 may either be of the rechargeable type or disposable when exhausted, and expediently housed in a small compartment, provided in the case 1 and having an access opening, wherethrough the battery is insertable, such opening being preferably closeable by means such as a lid or cover. An actuation switch for selectively actuating the motor 15 may be advantageously located on the exterior of the case 1 and may expediently be operable as a wall contacting means in an automatic manner upon the device being inserted into the cassette compartment of a video tape recorder, for example through linkages such as the ears 8,9 as utilized in the device of FIG. 1 of which a projecting portion 9' is symbolically shown in FIG. 2.

Furthermore the gear ratio of the gearing arrangement 16a–16c between the output shaft of the motor 14 and the cam 17 may be any ratio selected to provide the desired velocity of rotation of the cam 17, to cause in turn, adequate intermittent release of cleaning fluid from the pressurized container 12 to ensure thorough cleaning of the apparatus.

Obviously, the case 1 may be provided with access means such as a lid for permitting the replacement of exhausted containers or batteries, or even for replacement of the web 2 by removing the spools 3,4 and inserting new spools with a new web wound thereon, which must be simply trained around the guide rollers 21,22.

It has been found in practice that the invention achieves all of the cited objects and in particular, a device is provided which is very simple to use and which is insertable into the cassette compartment of a video-tape recorder, for thoroughly cleaning all of the tape contacting elements of the same in a very efficient, automatic manner without any manual intervention.

The device as described herein is susceptable to numerous modifications, which are all encompassed by the same inventive concept.

Thus as an example, an electrically or mechanically operated pump, could be utilized to deliver fluid from a container to means for distributing the fluid onto the web.

In practicing the invention any materials, dimensions and shapes may be used according to contingent requirements.

I claim:

1. A device for cleaning the tape contacting members in videotape recorders and the like apparatus comprising:
    a cassette tape housing means insertable into a cassette compartment of a cassette tape recorder apparatus including a pay-out spool and a take-up spool adapted to be rotated by a winding mechanism of the cassette recorder, a cleaning fluid receiving tape disposed between said spools, and guide means for guiding said tape between said spools along a tape traversing the front end of said housing means;
    a fluid applicator means for dispersing a cleaning fluid onto said cleaning tape, said applicator means disposed inside said housing means adjacent to said tape path between said pay-out spool and said front end;
    a revervoir means holding a supply of cleaning fluid disposed within said housing means;
    a valve means for selectively connecting said reservoir means in fluid communication with said applicator means so that cleaning fluid may be selectively delivered to said applicator means by opening said valve means, and
    an actuator means for selectively controlling said valve means, said actuator means disposed inside said housing and having wall contacting means for actuating said actuator means and automatically responsive to the insertion of said cassette tape housing means into the cassette compartment of the tape recorder.

2. A device according to claim 1, wherein said reservoir means comprises a pressurized aerosol type container having an outwardly projecting outlet tube, and said valve means comprises an aerosol outlet valve incorporated in said container cooperating with said outwardly projecting outlet tube to open said outlet valve when said outlet tube is actuated, and said actuator means includes a mechanism for causing actuation of said outlet tube responsive to actuation of said wall contacting means upon insertion of said cassette tape housing means into the cassette compartment of the tape recorder.

3. A device according to claim 1 wherein said cassette tape housing means includes lateral wall, and wherein said reservoir means comprises a pressurized aerosol type container having an outwardly projecting outlet tube in communication with said applicator means, said valve means comprises an aerosol outlet valve incorporated in said container and cooperating with said outwardly projecting outlet tube to open said outlet valve when said outlet tube is actuated, and wherein said actuator means includes a mechansim for causing actuation of said outlet tube, said mechanism comprising a plurality of movable linkage and abutment elements engaging said container and said applicator means, at least one of said linkage elements having a wall contacting means defining a portion yieldably protruding outwardly from at least one of said lateral walls to cause actuation of said actuator means when said cassette tape housing means are inserted into the cassette compartment of the recorder apparatus and said protruding portion of said linkage element is urged toward the inside of said cassette tape housing means.

4. A device for cleaning the tape contacting members in video tape recorders and the like apparatus comprising:
    cassette tape housing means insertable into a cassette compartment of a tape recorder apparatus including a pay-out spool and a take-up spool adapted to be rotated by a winding mechanism of the cassette recorder, a cleaning fluid receiving tape disposed between said spool, and guide means for guiding said tape between said spools along a tape path traversing the front end of said housing means;
    reservoir means for holding a supply of cleaning fluid disposed within said housing means;
    actuator means adapted for causing fluid to be displaced from said reservoir means, said actuator means comprising inside said housing means an electric motor having an output shaft, at least one electric battery for supplying electric energy to said motor, cam means adapted to act on said reservoir means, and transmission means including toothed gear wheels for transmitting rotation from said output shaft of said electric motor to said cam means to cause cleaning fluid to be displaced from said reservoir upon rotation of said cam means; and fluid applicator means for dispersing cleaning fluid displaced from said reservoir means onto said cleaning tape, said applicator means being disposed inside said housing means adjacent said tape path between said pay-out sppol and said front end.

5. A device according to claim 4 having abutment means disposed within said housing means, and wherein said reservoir means comprises a pressurized aerosol type container having an outwardly projecting outlet tube responsive to the abutment action of said abutment means and in communication with said applicator means, and an aerosol outlet valve incorporated in said container and cooperating with said outwardly projecting outlet tube to open said outlet valve when said outlet tube is actuated, and wherein said cam means is adapted to push said container in the direction toward said abutment means for actuation of said outlet tube.

* * * * *